United States Patent
Sun et al.

(10) Patent No.: US 10,021,224 B2
(45) Date of Patent: Jul. 10, 2018

(54) TRIGGER-BASED SINGLE USER UPLINK TRANSMISSION

(71) Applicant: Marvell World Trade Ltd., St. Michael (BB)

(72) Inventors: Yakun Sun, San Jose, CA (US);
Hongyuan Zhang, Fremont, CA (US);
Liwen Chu, San Ramon, CA (US); Lei Wang, San Diego, CA (US)

(73) Assignee: Marvell World Trade Ltd., St. Michael (BB)

( * ) Notice: Subject to any disclaimer, the term of this patent is extended or adjusted under 35 U.S.C. 154(b) by 29 days.

(21) Appl. No.: 15/372,146

(22) Filed: Dec. 7, 2016

(65) Prior Publication Data

US 2017/0163777 A1 Jun. 8, 2017

Related U.S. Application Data

(60) Provisional application No. 62/263,979, filed on Dec. 7, 2015.

(51) Int. Cl.
*H04L 29/08* (2006.01)
*H04L 5/00* (2006.01)
(Continued)

(52) U.S. Cl.
CPC ............ *H04L 69/324* (2013.01); *H04L 1/003* (2013.01); *H04L 1/0029* (2013.01);
(Continued)

(58) Field of Classification Search
CPC ..... H04L 69/324; H04L 1/0029; H04L 1/003; H04L 5/0007; H04L 5/0048;
(Continued)

(56) References Cited

U.S. PATENT DOCUMENTS 9,166,660 B2    5/2015  Chu et al.
2011/0261708 A1  10/2011 Grandhi
(Continued)

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

(Continued)

*Primary Examiner* — Duc C Ho

(57) ABSTRACT

A first communication device receives, from a second communication device, a trigger frame. The first communication device generates a single-user (SU) physical layer (PHY) protocol data unit that includes a PHY protocol payload, wherein the PHY protocol payload include information other than information that acknowledges a previous transmission from the second communication device. In response to the trigger frame, the first communication device transmits the SU PHY protocol data unit to the second communication device, such that the SU PHY protocol data unit is transmitted prior to the first communication device transmitting any other PHY protocol data unit after receiving the trigger frame.

26 Claims, 7 Drawing Sheets

(51) Int. Cl.
| | |
|---|---|
| *H04L 29/06* | (2006.01) |
| *H04W 72/04* | (2009.01) |
| *H04L 1/00* | (2006.01) |
| *H04W 74/06* | (2009.01) |
| *H04W 84/12* | (2009.01) |

(52) U.S. Cl.
CPC .......... *H04L 5/0007* (2013.01); *H04L 5/0048* (2013.01); *H04L 5/0053* (2013.01); *H04L 5/0094* (2013.01); *H04L 69/22* (2013.01); *H04L 69/323* (2013.01); *H04W 72/044* (2013.01); *H04W 74/06* (2013.01); *H04W 84/12* (2013.01)

(58) Field of Classification Search
CPC ... H04L 5/0053; H04L 5/0094; H04L 69/323; H04W 72/044; H04W 74/06; H04W 84/12
See application file for complete search history.

(56) References Cited

U.S. PATENT DOCUMENTS

| | | | |
|---|---|---|---|
| 2013/0229996 A1 | 9/2013 | Wang et al. | |
| 2015/0063190 A1 | 3/2015 | Merlin et al. | |
| 2015/0124843 A1 | 5/2015 | Azizi et al. | |
| 2015/0131517 A1 | 5/2015 | Chu et al. | |
| 2016/0066318 A1* | 3/2016 | Pereira ................. | H04L 5/0007 370/329 |
| 2016/0165607 A1* | 6/2016 | Hedayat ............ | H04W 72/0453 370/338 |
| 2016/0286012 A1* | 9/2016 | Yu ........................ | H04L 69/321 |
| 2016/0315796 A1* | 10/2016 | Kwon ................. | H04L 27/2665 |
| 2016/0360509 A1* | 12/2016 | Seok ...................... | H04L 45/74 |
| 2017/0142659 A1* | 5/2017 | Noh ................... | H04W 52/0245 |
| 2017/0331587 A1* | 11/2017 | Kim ..................... | H04L 1/0045 |

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages. (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages. (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages. (Sep. 2016).

IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std 802.11™ 2012 (Revision of IEEE Std 802.11—2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. Jan. 2695 (Mar. 29, 2012).

IEEE P802.15.4m/D3, May, 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

Chun et al., "Legacy Support on HEW frame structure," doc: IEEE 11-13/1057r0, *The Institute of Electrical and Electronics Engineers*, Inc., pp. 1-8 (Sep. 2013).

Perahia et al., "Gigabit Wireless LANs: an overview of IEEE 802.11ac and 80211ad," ACM Sigmobile Mobile Computing and Communications Review, vol. 15, No. 3, pp. 23-33 (Jul. 2011).

Seok et al., "HEW PPDU Format for Supporting MIMO-OFDMA," IEEE 802.11-14/1210r0, 16 pages, (Sep. 14, 2014).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

International Search Report and Written Opinion in International Patent Application No. PCT/US2016/065406, dated Mar. 21, 2017 (15 pages).

Kwon et al., "SIG Structure for UL PPDU," IEEE Draft, doc. IEEE 802.11-15/0574r0, vol. 802.11ax, 18 pages (May 11, 2015).

Merlin et al., "Trigger Frame Format," IEEE Draft, doc. IEEE 802.11-15/08770 , vol. 802.11ax, No. 1, 16 pages (Jul. 13, 2015).

Stacey, "Specification Framework for TGax," doc. IEEE 802.11-15/0132r12, vol. 802.11ax, No. 12, 38 pages (Dec. 1, 2015).

* cited by examiner

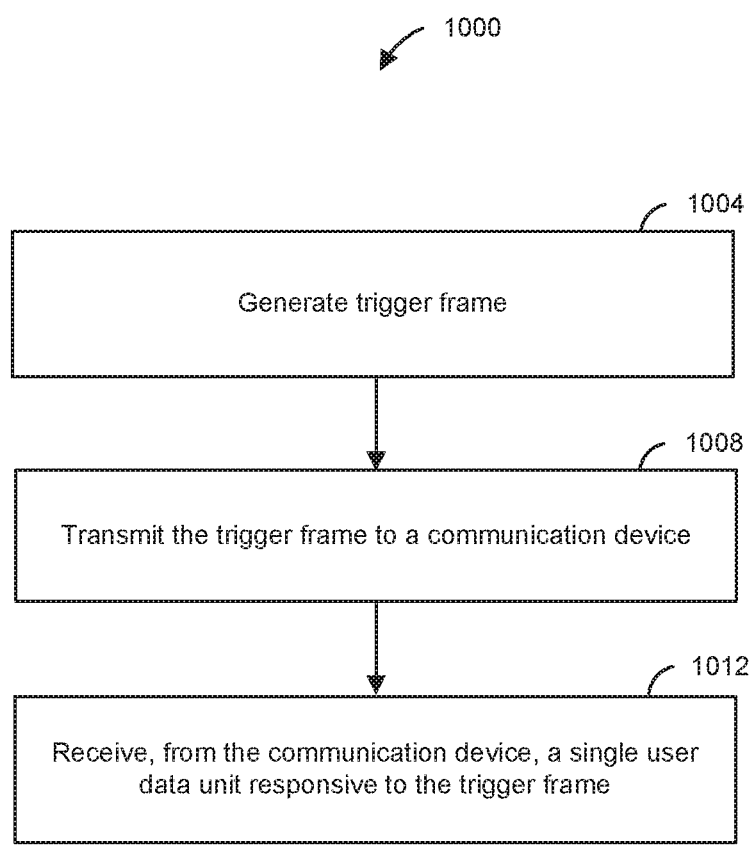

TRIGGER-BASED SINGLE USER UPLINK TRANSMISSION

CROSS-REFERENCES TO RELATED APPLICATIONS

This application claims the benefit of U.S. Provisional Patent Application No. 62/263,979, filed Dec. 7, 2015, entitled "Trigger-based Single User UL Transmission in 802.11ax," the disclosure of which is hereby expressly incorporated herein by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes: receiving, at a first communication device from a second communication device, a trigger frame; generating, at the first communication device, a single-user (SU) physical layer (PHY) protocol data unit that includes a PHY protocol payload, wherein the PHY protocol payload include information other than information that acknowledges a previous transmission from the second communication device; and in response to the trigger frame, transmitting the SU PHY protocol data unit from the first communication device to the second communication device, wherein the first communication device transmits the SU PHY protocol data unit prior to the first communication device transmitting any other PHY protocol data unit after receiving the trigger frame.

In another embodiment, an apparatus comprises a network interface device associated with a first communication device, the network interface device having i) a media access control layer (MAC) protocol processor implemented on one or more integrated circuits (ICs), and ii) a physical layer (PHY) protocol processor implemented on the one or more ICs. The one or more ICs are configured to: receive a trigger frame from a second communication device, generate a single-user (SU) physical layer (PHY) protocol data unit that includes a PHY protocol payload, wherein the PHY protocol payload include information other than information that acknowledges a previous transmission from the second communication device, and cause the first communication device to transmit, to the second communication device, the SU PHY protocol data unit in response to the trigger frame, such that the SU PHY protocol data unit is transmitted prior to the first communication device transmitting any other PHY protocol data unit after receiving the trigger frame.

In yet another embodiment a method includes: generating, at a first communication device, a trigger frame configured to prompt a second communication device to transmit a single-user (SU) physical layer (PHY) protocol data unit to the first communication device; transmitting, from the first communication device to the second communication device, the trigger frame; and receiving, at the first communication device from the second communication device, the SU PHY protocol data unit having been transmitted by the second communication device in response to the trigger frame, wherein the SU PHY protocol data unit includes a PHY protocol payload that includes information other than information that acknowledges a previous transmission by the first communication device, and the SU PHY protocol data unit is received at the first communication device prior to receiving any other PHY protocol data unit from the second communication device after transmitting the trigger frame.

In still another embodiment, an apparatus comprises a network interface device associated with a first communication device, the network interface device having i) a media access control layer (MAC) protocol processor implemented on one or more integrated circuits (ICs), and ii) a physical layer (PHY) protocol processor implemented on the one or more ICs. The one or more ICs are configured to: generate a trigger frame configured to prompt a second communication device to transmit a single-user (SU) physical layer (PHY) protocol data unit to the first communication device, cause the first communication device to transmit the trigger frame to the second communication device, and receive the SU PHY protocol data unit from the second communication device, wherein the second communication device transmitted the SU PHY protocol data unit in response to the trigger frame, the SU PHY protocol data unit includes a PHY protocol payload that includes information other than information that acknowledges a previous transmission by the first communication device, and the SU PHY protocol data unit is received at the first communication device prior to receiving any other PHY protocol data unit from the second communication device after transmitting the trigger frame.

BRIEF DESCRIPTION OF THE DRAWINGS

FIG. 10 is a flow diagram of another example method for communicating in a wireless communication network, according to an embodiment.

DETAILED DESCRIPTION

In embodiments described below, a wireless network device such as an access point (AP) of a wireless local area network (WLAN) communicates with one or more client stations. The AP is configured to operate with client stations according to at least one communication protocol. In an embodiment, the communication protocol supports single-user (SU) communication in both downlink direction from the AP to a client station and uplink direction from a client station to the AP. In an embodiment, the communication protocol also supports multi-user (MU) communication in both downlink direction from the AP to client stations and uplink direction from the client stations to the AP. In various embodiments described below, methods and apparatus for triggered uplink SU transmissions are described. For example, in an embodiment, an AP transmits a trigger frame to a client station in the WLAN network, and in response to the trigger frame, a client station transmits one or more uplink SU data units.

Figure 1:
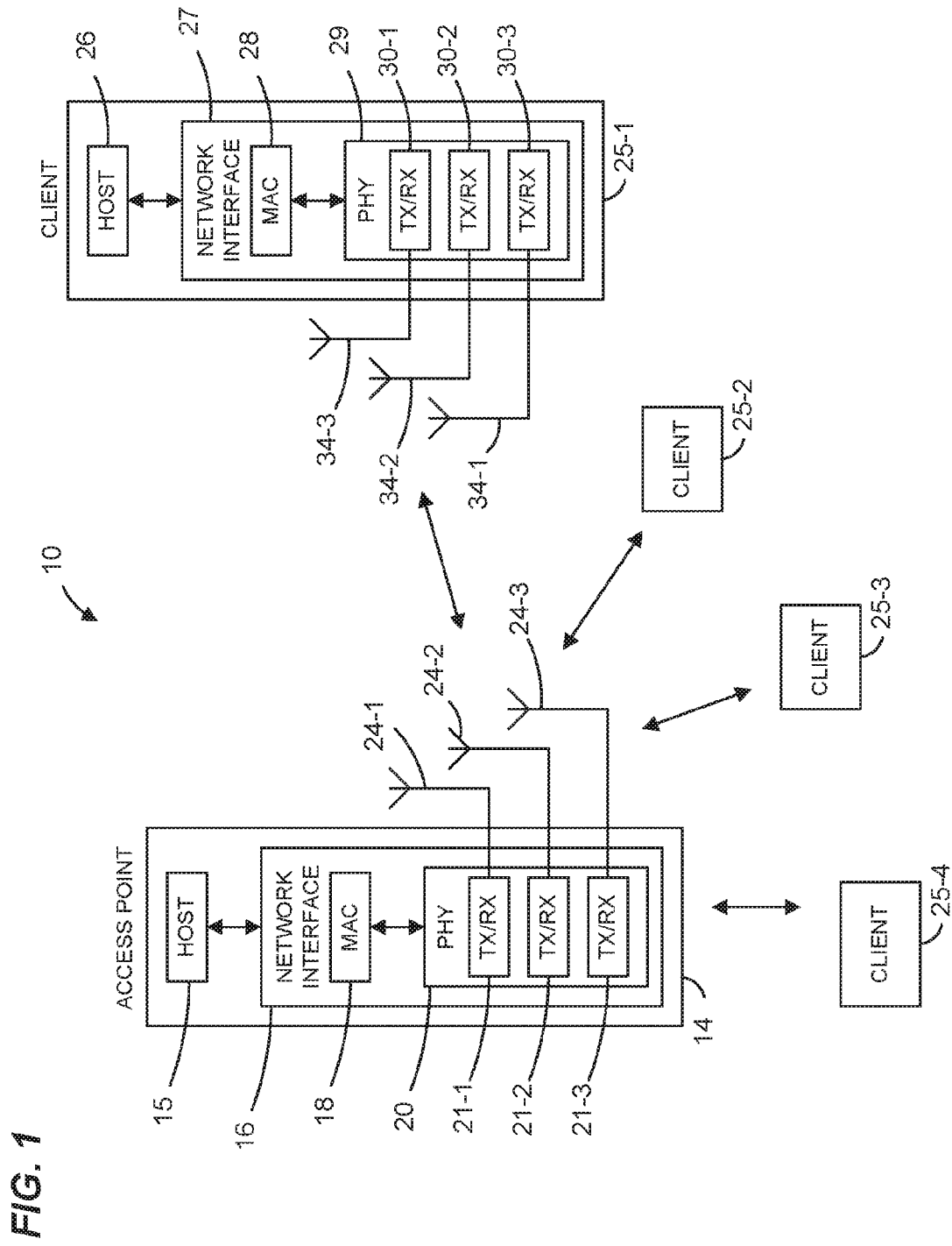
FIG. 1 is a block diagram of an example wireless local area network (WLAN), according to an embodiment.

FIG. 1 is a block diagram of an example wireless local area network (WLAN) 10, according to an embodiment. The WLAN 10 supports downlink (DL) and uplink (UL) single-user (SU) communication between an access point (AP) and client stations. The WLAN 10 also supports downlink (DL) and uplink (UL) multiuser (MU) communication between an access point (AP) and client stations, in an embodiment.

The WLAN 10 includes an AP 14, and the AP 14, in turn, includes a host processor 15 coupled to a network interface 16. In an embodiment, the network interface 16 includes one or more integrate circuits (ICs) configured to operate as discussed below. The network interface 16 includes a medium access control layer (MAC) protocol processor 18 and a physical layer (PHY) protocol processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized.

In some embodiments, the MAC processor 18 and the PHY processor 20 are implemented on one or more integrated circuits (ICs). For example, in an embodiment, at least a portion of the MAC processor 18 is implemented on a first IC, and at least a portion of the PHY processor 20 is implemented on a second IC. As another example, in an embodiment, at least a portion of the MAC processor 18 and at least a portion of the PHY processor 20 are implemented on a single IC.

In various embodiments, the MAC processor 18 and the PHY processor 20 are configured to operate according to a wireless communication protocol.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments.

A client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized.

In some embodiments, the MAC processor 28 and the PHY processor 29 are implemented on one or more ICs. For example, in an embodiment, at least a portion of the MAC processor 28 is implemented on a first IC, and at least a portion of the PHY processor 29 is implemented on a second IC. As another example, in an embodiment, at least a portion of the MAC processor 28 and at least a portion of the PHY processor 29 are implemented on a single IC.

In an embodiment, one or more of the client stations 25-2, 25-3, and 25-4 has a structure that is the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to a communication protocol and having formats described herein. In an embodiment, the MAC processor 18 is configured to implement MAC layer functions, including MAC layer functions of the communication protocol. In an embodiment, the PHY processor 20 is configured to implement PHY functions, including PHY functions of the communication protocol. For example, in an embodiment, the MAC processor 18 is configured to generate MAC protocol data units such as MAC service data units (MSDUs), MAC protocol data units (MPDUs), MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the communication protocol and having formats described hereinafter and to determine that such data units conform to the communication protocol, according to various embodiments.

In various embodiments, the MAC processor 28 and the PHY processor 29 of the client device 25-1 are configured to generate data units conforming to the communication protocol and having formats described herein. In an embodiment, the MAC processor 28 is configured to implement MAC layer functions, including MAC layer functions of the communication protocol. In an embodiment, the PHY processor 29 is configured to implement PHY functions, including PHY functions of the communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the communication protocol and having formats described hereinafter and to determine that such data units conform to the communication protocol, according to various embodiments.

Figure 2:
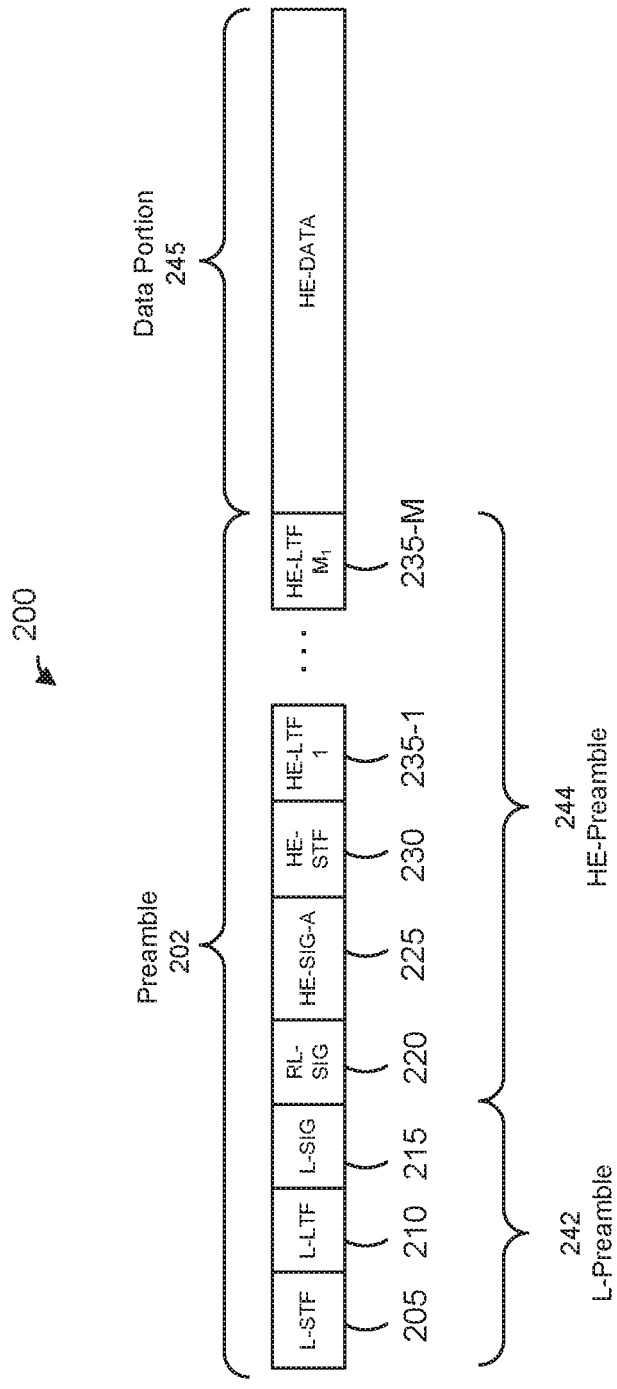
FIG. 2 is a diagram of a physical layer (PHY) protocol data unit, according to an embodiment.

FIG. 2 is a diagram of a PPDU 200 that the AP 14 is configured to transmit to one or more client stations 25 (e.g., the client station 25-1), according to an embodiment. In an embodiment, one or more client stations 25 (e.g., the client station 25-1) are also configured to transmit data units the same as or similar to the PHY data unit 200 to the AP 14. The PHY data unit 200 occupies a 20 MHz bandwidth, in an embodiment. PHY data units similar to the PHY data unit 200 occupy other suitable bandwidth such as 40 MHz, 80 MHz, 160 MHz, 320 MHz, 640 MHz, for example, or other suitable bandwidths, in other embodiments.

In various embodiments and/or scenarios, the PHY data unit 200 is a downlink (DL) data unit transmitted from the AP 14 to a client station 25. Similarly, in various embodiments and/or scenarios, the PHY data unit 200 is an uplink (UL) data unit transmitted by a particular client station 25 to the AP 14. In an embodiment, the PHY data unit 200 is a UL or a DL data unit transmitted in an SU mode. In an embodiment, the PHY data unit 200 is transmitted by the AP 14 or the client station 25 using a set of orthogonal frequency division multiplexing (OFDM) tones allocated to the client station 25 by the AP 14.

The PHY data unit 200 includes a PHY preamble 202 including a legacy short training field (L-STF) 205, a legacy long training field (L-LTF) 210, a legacy signal field (L-SIG) 215, a repeated legacy signal field (RL-SIG) 220, a HE signal field (HE-SIG-A) 225, an HE short training field (HE-STF) 230, and M HE long training fields (HE-LTFs) 235, where M is a suitable positive integer. In some embodiments and/or scenarios, M corresponds to a number of spatial streams utilized in the PHY data unit 200. In some embodiments and/or scenarios, M is greater than the number of spatial streams utilized in the PHY data unit 200.

L-STF 205, L-LTF 210, and L-SIG 215 are components of a legacy preamble portion (L-Preamble) 242, according to an embodiment. RL-SIG 220, HE-STF 230, and HE-LTFs 235 are components of an HE preamble portion (HE-Preamble) 244, according to an embodiment.

In some embodiments and/or scenarios, the PHY data unit 200 also includes a data portion 245. In some embodiments and/or scenarios, the PHY data unit 200 does not include the data portion 245 (e.g., for a null data packet (NDP), some control frames and/or some management frames, etc.). In an embodiment, each of L-STF 205, L-LTF 210, L-SIG 215, RL-SIG 220, HE-SIG-A 225, HE-STF 230, and HE-LTFs 235 comprises one or more OFDM symbols.

The PHY data unit format 200 is merely an example format. In other embodiments, other suitable PHY data unit formats are utilized. For example, in some embodiments and/or scenarios, the preamble 202 does not include one or more of the fields—illustrated in FIG. 2. As illustrative examples, the preamble 202 omits the HE-SIG-A 225 and/or one or more fields in the L-preamble 242, in some embodiments. In some embodiments, the preamble 202 includes additional fields not illustrated in FIG. 2. For example, in an embodiment, the preamble 202 includes a signal field (e.g., HE-SIG-B) between HE-LTFs 235 and the data portion 245.

In the embodiment of FIG. 2, the communication protocol supports transmission of PHY data units in communication channels having different bandwidths. For instance, in an embodiment, the communication protocol defines component sub-channels that can be utilized individually or aggregated to form a composite communication channel. In an embodiment, each component channel occupies a suitable bandwidth such as 1 MHz, 2 MHz, 5 MHz, 10 MHz, 20 MHz, etc. In one illustrative embodiment, each composite channel has a bandwidth of 20 MHz, and a composite channel has a suitable bandwidth that is a multiple of 20 MHz such as 40 MHz, 80 MHz, 120 MHz, 160 MHz, 320 MHz, 640 MHz, etc.

In an embodiment, the PHY data unit 200 is configured for transmission in a component channel. In embodiments supporting aggregation of component channels to form composite channels, one or more of the fields of the preamble 202 are duplicated in each of a plurality of component channels of a composite channel. In some embodiments, some of the fields of the preamble 202 are not duplicated in each component channel, but rather span the entire composite channel, at least for SU data units. For example, in some embodiments, L-Preamble 242, RL-SIG 220, and HE-SIGA 225 are duplicated in each component channel, whereas HE-STF 230 and HE-LTFs 235 span the entire composite channel. In an embodiment, when the PHY data unit 200 is a SU data unit, the data portion 245 spans the entire composite channel.

In various embodiments, L-STF 205 and L-LTF 210 include signals configured for one or more of carrier frequency acquisition, automatic gain control (AGC), channel estimation, etc. In an embodiment, the HE-SIG-A 225 generally includes information specifying a format of the PHY data unit 200, such as information needed to properly decode at least a portion of the PHY data unit 200, in an embodiment. For instance, in an embodiment, HE-SIG-A 225 includes one or more of i) an indication of a modulation and coding scheme (MCS) used for the data portion 245, ii) an indication of a bandwidth of the PHY data unit 200, a duration of the PHY data unit 200, etc. In some embodiments, HE-SIG-A 225 includes an indication of a remaining duration of a current transmit opportunity period (TXOP). In an embodiment, HE-STF 230 includes signals configured for performing AGC and HE-LTFs 235 includes signals configured for estimation of a MIMO channel.

In the current IEEE 802.11 ac WLAN communication protocols, UL SU transmissions are self-initiated. For example, when a client station has UL data for an AP, the client station transmits a SU UL PHY data unit in response to the client station determining that a network allocation vector (NAV) timer of the client station has expired and/or performing a clear channel assessment (CCA) procedure (e.g., the client station measures a signal power level and the client station compares the signal power level to a threshold)

that determines that a communication channel is idle. In various embodiments described below, however, a client station, such as the client station 25, receives a trigger frame from an AP, such as the AP 14, and in response to the trigger frame transmits one or more UL SU data units.

In various embodiments described herein, a trigger frame includes various parameters that a client station then utilizes for an UL SU transmission in response to the trigger frame. In an embodiment, a trigger frame from the AP 14 includes one or more transmission parameters that the client station 25 should use for the UL SU transmission, such as an MCS. In some embodiments, inclusion of such transmission parameters in the trigger frame reduces processing overhead necessary at the client station for generating and transmitting the UL SU transmission and/or at the AP. For example, because the AP 14 specifies such transmission parameters, the client station 25 omits one or more fields that otherwise include such transmission parameters from a preamble of the UL SU data unit. Similarly, because the AP 14 already knows transmission parameters that were used to transmit the UL SU data unit, and fields that include such transmission parameters are omitted from the preamble of the UL SU data unit, the AP 14 does not need to process such fields in the preamble of the UL SU data unit in order to determine such transmission parameters. In some embodiments and/or scenarios, such reductions in processing overhead lead to reducing power consumption in the client station and/or the AP. In some embodiments, one or more of L-STF 205, L-LTF 210, L-SIG 215, RL-SIG 220, HE-SIG-A 225, HE-STF 230, and HE-LTF 235 are omitted from a preamble of the UL SU data unit transmitted in response to the trigger frame. In some embodiments in which one or more of L-STF 205, L-LTF 210, L-SIG 215, RL-SIG 220, HE-SIG-A 225, HE-STF 230, and HE-LTF 235 are included in the preamble of the UL SU data unit, the AP 14 does not process one or more of L-STF 205, L-LTF 210, L-SIG 215, RL-SIG 220, HE-SIG-A 225, HE-STF 230, and HE-LTF 235.

In some embodiments and/or scenarios, the client station 25 uses one or more training signals included in the trigger frame (e.g., in a preamble of the trigger frame) to estimate a carrier frequency offset (CFO) and generates the UL SU PHY data unit to pre-compensate for CFO using the estimate of the CFO. In some embodiments, UL SU PHY data units that are generated to pre-compensate for CFO improve reception quality at the AP 14, and thus permit one or more of increased range, increased throughput, etc. In some embodiments, UL SU PHY data units that are generated to pre-compensate for CFO decrease processing overhead at the AP 14.

Figure 3:
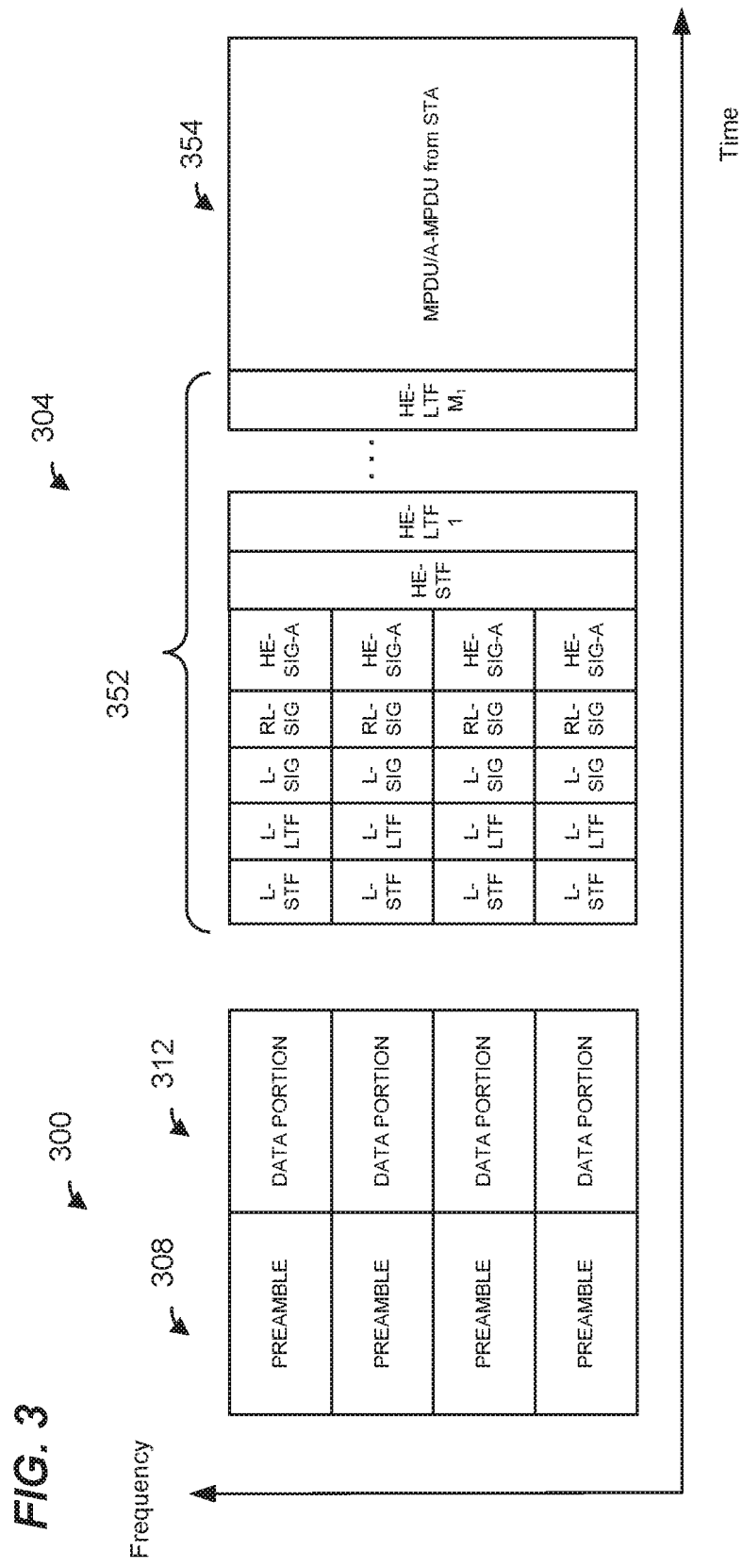
FIG. 3 is a diagram of an example transmission sequence in a WLAN according to an embodiment.

FIG. 3 is a diagram of an example frame exchange between an AP and a client station, according to an embodiment. A PHY data unit 300 corresponds to a trigger frame that prompts an UL SU transmission, e.g., an UL SU PHY data unit 304, in an embodiment. For instance, in an embodiment, the PHY data unit 300 is transmitted by the AP 14 to the client station 25-1 in order to prompt the client station 25-1 to transmit the UL SU PHY data unit 304. In response to trigger frame 300, the client station 25 transmits the UL SU PHY data unit 304.

The PHY data unit 300 includes a preamble portion 308 and a data portion 312. In some embodiments, the preamble portion 308 corresponds to a legacy preamble and conforms to a preamble format according to a legacy communication protocol, such as the IEEE 802.11a Standard, the IEEE 802.11n Standard, the IEEE 802.11ac Standard, etc. In another embodiment, the preamble 308 includes at least a non-legacy preamble portion conforming to a suitable communication protocol. For example, in an embodiment, the preamble portion 308 includes a preamble having a structure such as (e.g., the same as or similar to) the preamble 204 discussed above in connection with FIG. 2. In the example illustrated in FIG. 3, the data unit is configured for transmission in a composite channel comprising multiple component channels, and at least some fields in the preamble portion 308 are duplicated in each component channel, according to some embodiments.

In an embodiment, the data portion 312 includes data that is duplicated in multiple component channels (e.g., in multiple 20 MHz bandwidth portions). In another embodiment, the data portion 312 spans the entire bandwidth of the composite channel rather than duplicated in multiple component channels. In an embodiment, the data portion 312 includes a trigger frame configured to trigger an UL SU PHY data unit.

In various embodiments, transmission parameters to be used for UL SU transmission following a trigger frame, such as the PHY data unit 300, are included in the preamble portion 308 and/or the data portion 312 of the PHY data unit 300. In an embodiment, the PHY data unit 300 includes one or more indications of one or more transmission parameters to be used by the client station 25 when transmitting the UL SU data unit, such as an MCS, one or more OFDM numerology parameters (e.g., guard interval, tone spacing, etc.), transmit power, etc. In an embodiment, the PHY data unit 300 includes an indication of information regarding length or duration of the UL SU PHY data unit 304. For example, in an embodiment, the PHY data unit 300 includes an indicator of a maximum length or a duration of the UL SU PHY data unit 304 and/or an indicator of a duration of a current TXOP. In some embodiments, the PHY data unit 300 includes an indicator of an allocation of OFDM tones and/or subchannels (e.g., component channels) for transmitting the UL SU PHY data unit 350, in an embodiment. In some embodiments, the PHY data unit 300 includes indicators of other suitable parameters to be used by the client station 25 for the UL SU PHY data unit 304.

The UL SU PHY data unit 304 includes a preamble portion 352 and a data portion 354. In an embodiment, the preamble portion 352 includes a preamble such as (e.g., the same as or similar to) the preamble 204 discussed above in connection with FIG. 2. In an embodiment, the UL SU PHY data unit 304 is transmitted by a client station 25 in response to a trigger frame from the AP 14, such as a trigger frame included in the PHY data unit 300. In an embodiment, the UL SU PHY data unit 304 is transmitted using one or more of i) an MCS, ii) an OFDM numerology, iii) a transmit power, etc., as specified by indicators included in the PHY data unit 300. In an embodiment, the client station 25-1 generates the UL SU PHY data unit 304 to have a length/duration that is less than or equal to the maximum length/duration indicated in the PHY data unit 300. In an embodiment, the client station 25-1 generates the UL SU PHY data unit 304 to have a length/duration that is based on a duration of the current TXOP or a duration of remaining time in the current TXOP indicated in the PHY data unit 300. In an embodiment, the PHY data unit 350 is transmitted over OFDM tones that are indicated in the PHY data unit 300. In an embodiment, the client station 25-1 transmits the UL SU PHY data unit 304 over the same component or composite channel as that used for transmitting the PHY data unit 300. In an embodiment, other suitable parameters are included in the PHY data unit 300 and are used by the client station 25 to generate the UL SU PHY data unit 304. In some embodiments, a client station generates the UL SU PHY data unit 304 to pre-compensate for CFO, which the client station estimated using training fields in the PHY data unit 300.

In some embodiments, the client station 25 generates the UL SU PHY data unit 304 such that one or more of fields illustrated in FIG. 3 of the preamble portion 352 are omitted from the preamble portion 352. In some embodiments, one or more fields that are omitted from the preamble portion 352 are included in the preamble portion 308 of the PHY data unit 300. For instance, in an embodiment, while the preamble portion 308 of the PHY data unit 300 includes L-STF field, L-LTF field, HE-STF field, and HE-LTF field, the preamble portion 352 omits one or more of L-STF field, L-LTF field, HE-STF field, and HE-LTF field. In some embodiments, while the preamble portion 308 of the PHY data unit 300 includes L-SIG field and HE-SIG field, the preamble portion 352 omits one or more of L-SIG field and HE-SIG field. In some embodiments, one or more fields in the preamble portion 352 are not fully processed by the AP (e.g., not decoded, decoded but information included therein is ignored by the AP, etc.).

In an embodiment, the client station 25 omits one or more fields illustrated in FIG. 3 of the preamble portion 352 in response to determining that the PHY data unit 300 includes one or more indications of transmission parameters to be used for UL SU PHY data unit 304. In other embodiments, the PHY data unit 300 does not include indications of transmission parameters to be used for UL SU PHY data unit 304. In some such embodiments, in response to determining that the PHY data unit 300 does not include indications of transmission parameters to be used for UL SU PHY data unit 304, the client station 25 does not omit any field from the preamble portion 352.

In an embodiment, the AP 14 does not fully process one or more fields illustrated in FIG. 3 of the preamble portion 352 if the PHY data unit 300 includes indications of transmission parameters to be used for UL SU PHY data unit 304. In other embodiments, the AP 14 fully processes all fields illustrated in the in FIG. 3 of the preamble portion 352 if the PHY data unit 300 does not include indications of transmission parameters to be used for UL SU PHY data unit 304.

In an embodiment, the data portion 354 of the data unit 350 includes one or more MPDUs and/or aggregated MPDUs (A-MPDUs). In an embodiment, the data portion 354 of the data unit 350 spans an entire bandwidth of a composite channel. For instance, in an embodiment where the PHY data unit 350 occupies a bandwidth of 80 MHz and where at least some fields of the preamble portion 352 are duplicated in each 20 MHz bandwidth portion of the data unit 350, the data portion 354 spans an entire bandwidth of 80 MHz. In other embodiments, the data portion 354 includes portions duplicated in multiple composite channels.

Figure 4:
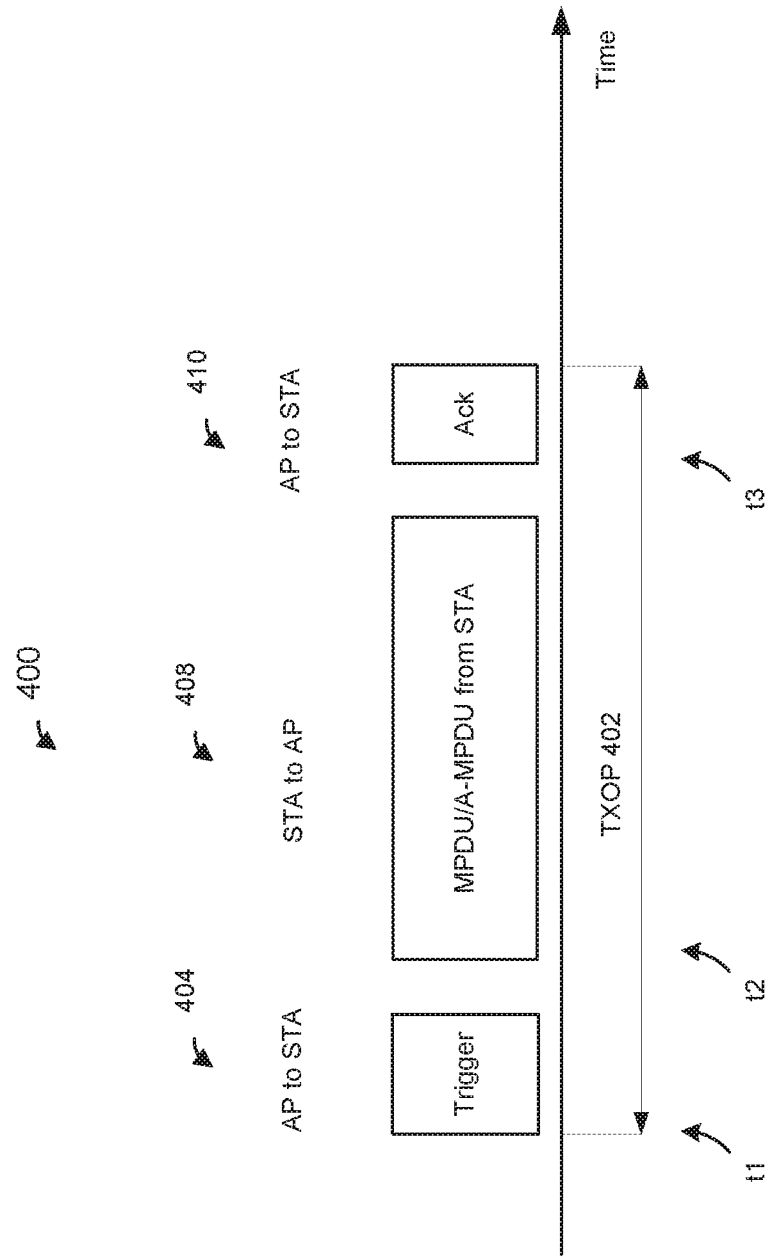
FIG. 4 is a diagram of another example transmission sequence in a WLAN according to an embodiment.

FIG. 4 is a diagram of an example transmission sequence 400 in a WLAN, such as the WLAN 10 of FIG. 1, according to an embodiment, in which an AP, such as the AP 14, triggers a UL SU PHY data unit by a client station, such as the client station 25-1. In an embodiment, the transmission sequence 400 is completed during a TXOP 402. In some embodiments, the TXOP is obtained by the AP in a suitable manner (e.g., using a suitable channel access procedure, such as request-to-send/clear-to-send (RTS/CTS) protocol, scheduled, etc.).

At a time t1, the AP 14 begins transmission of a PHY data unit 404, which includes a trigger frame 404, to the client station 25. In an embodiment, the PHY data unit 404 is a physical layer convergence protocol (PLCP) protocol data unit (PPDU) that includes uplink transmission parameters that are to be used by the client station for an UL SU PHY data unit by the client station 25. In an embodiment, the trigger frame in the PHY data unit 404 is a MAC control frame that includes uplink transmission parameters to be used for an UL SU transmission by the client station 25. In an embodiment, the MAC control frame is included in a data portion the PHY data unit, such as the data portion 304 of the PHY data unit 300 of FIG. 3, or another suitable PHY data unit. In another embodiment, the PHY data unit 404 is an NDP that includes uplink transmission information in a preamble, and omits a data portion.

In an embodiment, the PHY data unit 404 is configured to reserve the TXOP. In other embodiments, the TXOP 402 is reserved in another suitable manner (e.g., with an RTS/CTS, a CTS-to-self, etc.). In an embodiment, a trigger frame that spans the entire composite channel is relatively shorter, and accordingly is transmitted in a relatively shorter time period, as compared to a trigger frame that is duplicated in each component channel. In embodiments in which the AP is the TXOP holder, the AP will often have a higher transmission power than a client station in some scenarios, and thus reservation of the TXOP by the AP will often improve channel contention, in at least some embodiments and/or scenarios.

In an embodiment, the PHY data unit 404 includes an indication of a duration of the TXOP 402.

At time t2, the client station 25 begins transmission of a UL SU PHY data unit 408. In an embodiment, t2 occurs at a predetermined time interval after an end of reception of the PHY data unit 404 by the client station 25, such as for example a time interval corresponding to a short inter-frame space (SIFS), or another suitable timer period (e.g., a point coordination function (PCF) interframe space (PIFS), a distributed coordination function (DCF) interframe space (DIFS), an extended interframe space (EIFS), as defined by the IEEE 802.11 Standard, etc.), in an embodiment.

In an embodiment, the UL SU PHY data unit 408 has a format the same as or similar to the format discussed in connection with FIG. 2 or FIG. 3. In another embodiment, the UL SU transmission 408 has another suitable format.

In an embodiment, the client station 25 synchronizes with the PHY data unit 404 and transmits the UL SU transmission 408 after a pre-determined time period (e.g., SIFS) after an end of the PHY data unit 404, the transmission sequence 400 improves timing efficiency. For instance, in an embodiment, the AP 14 need wait only for a duration equal to a sum of the predetermined time period (e.g., SIFS) and a round-trip delay (between the AP and the client station) to receive the UL SU PHY data unit 408. In some embodiments, the AP 14 waits only for a duration substantially equal to the sum of the predetermined time period (e.g., SIFS) and the round-trip delay before determining that the client station did not respond to the PHY data unit 404.

In an embodiment, the AP 14 determines that the UL SU PHY data unit 408 is from the client station 25 to which the AP 14 transmitted the PHY data unit 404. In an embodiment, this determination is made at the AP 14 at least in party by measuring, at the AP 14, a time interval between an end of the trigger frame 404 and a beginning of the received UL SU PHY data unit 408. For instance, based on the determination that the time interval is equal to a sum of the predetermined time period (e.g., SIFS) and the round-trip delay, the AP 14 determines that the UL SU PHY data unit 408 is a response to the PHY data unit 404. In an embodiment, determination, at the AP 14, that an UL SU PHY data unit 408 is in response to the trigger frame 404 simplifies identification of received data units at the AP 14. For instance, in some such embodiments, the AP 14 need not separately analyze a transmitter address in a MAC header of the UL SU PHY data unit 408.

At a time t3, the AP 14 begins transmitting a PHY data unit 410 that includes an acknowledgement (ACK) frame to the client station 25 acknowledging receipt of the UL SU PHY data unit 408 from the client station 25. In another embodiment, the PHY data unit 410 includes a broadcast acknowledgement frame that includes an acknowledgement for the client station 25. In an embodiment, time t3 begins upon expiration of a predetermined time period, such as SIFS, PIFS, DIFS, EIFS, etc., after completion of reception of the UL SU PHY data unit 408 at the AP 14, in an embodiment. In an embodiment, the AP 14 transmits the PHY data unit 410 to the client station 25 in a same channel in which the PHY data unit 408 was transmitted. In another embodiment, the PHY data unit 410 includes a block acknowledgement (BA) frame that acknowledges multiple frames transmitted in other PHY data units in addition to the PHY data unit 408.

In some embodiments, the PHY data unit 404 includes data for the client station 25 other than the trigger frame. For example, in an embodiment, the PHY data unit 404 includes one or more MPDUs and/or A-MPDUs for the client station 25 in addition to the trigger frame.

FIGS. 5-8 are examples of PPDUs that a client station 25 is configured to transmit in response to a trigger frame, such as the trigger frame included in the PHY data unit 404, from an AP 14, according to various embodiments. The PHY data units of FIGS. 5-8 occupy a 20 MHz bandwidth, in an embodiment. PHY data units similar to the PHY data units of FIGS. 5-8 occupy other suitable bandwidths such as 40 MHz, 80 MHz, 160 MHz, 320 MHz, 640 MHz, for example, or other suitable bandwidths, in other embodiments.

Figure 5:
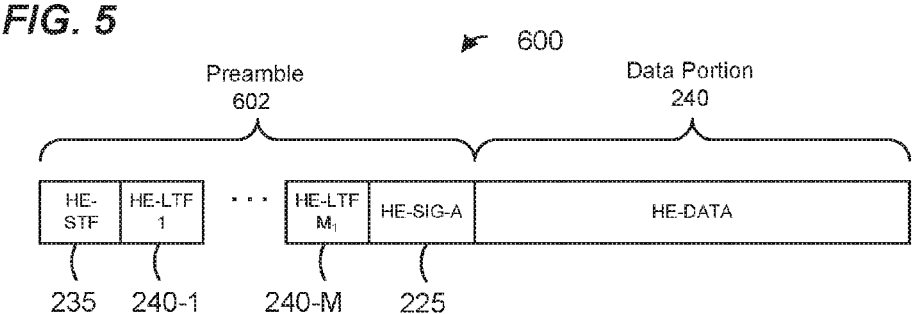
FIG. 5 is a diagram of an example PHY protocol data unit, according to an embodiment.

FIG. 5 is an example of a PHY data unit 600 that omits legacy training fields and legacy signal fields, such as those included in the L-Preamble 242. In an embodiment, the PHY data unit 600 is generated at the client station 25 using transmission parameters signaled in a trigger frame, such as trigger frame 404. In an embodiment, the PHY data unit 600 is generated at the client station 25 after performing pre-compensation for CFO based on the PHY data unit 404.

In some embodiments, the AP 14 is able to decode and process the PHY data unit 600, even in the absence of the L-Preamble 242, because of the CFO pre-compensation performed at the client station 25. In an embodiment, CFO estimation and correction at the AP 14 is simplified because the client station 25 pre-compensates for CFO. For instance, CFO estimation and correction at the AP 14 is performed using HE-STF field 235 and/or HE-LTF field 240.

Figure 6:
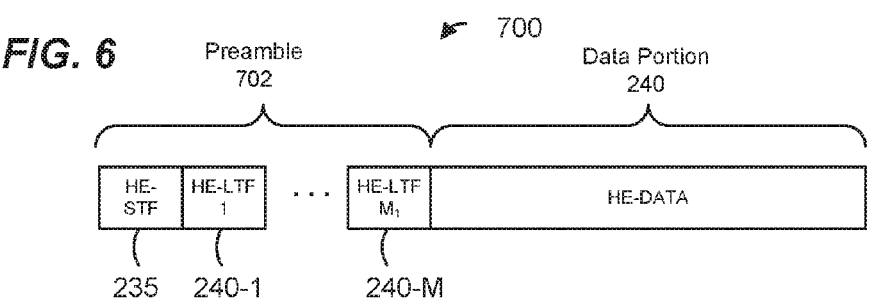
FIG. 6 is a diagram of another example PHY protocol data unit, according to an embodiment.

FIG. 6 is another example of PHY data unit 700 that a client station 25 is configured to transmit in response to a trigger frame included in the PHY data unit 404. PHY data unit 700 is similar to the PHY data unit 600 except that in addition to the L-Preamble 242, the PHY data unit 700 also omits an HE-SIG-A field, such as the HE-SIG-A field 225. In some embodiments, the AP 14 is able to decode and process the PHY data unit 700, even in the absence of the HE-SIG-A field 225, because the AP knows the transmission parameters (e.g., MCS, bandwidth, etc.) used for the PHY data unit 700 (having previously signaled the transmission parameters in the trigger frame included in the PHY data unit 404).

Figure 7:
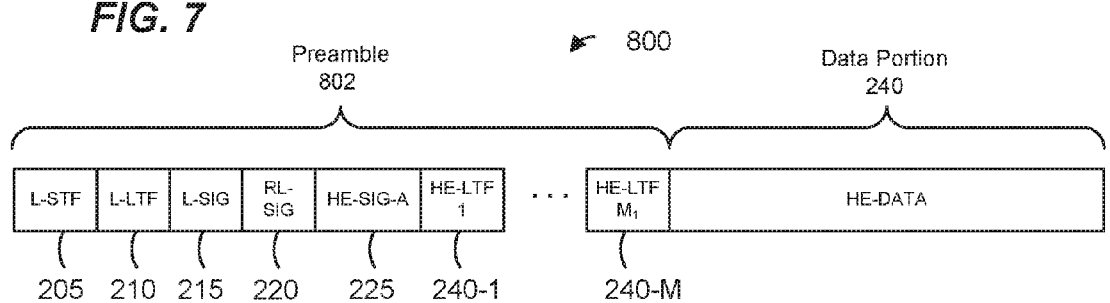
FIG. 7 is a diagram of another example PHY protocol data unit, according to an embodiment.

FIG. 7 is another example of PHY data unit 800 that a client station 25 is configured to transmit in response to a trigger frame included in the PHY data unit 404. The PHY data unit 800 skips an HE-STF field, such as the HE-STF field 235. In such embodiments, CFO estimation and correction and AGC are performed using the L-STF field 205. In some such embodiments, the client station 25 pre-compensates for CFO prior to transmission of the PHY data unit 800.

Figure 8:
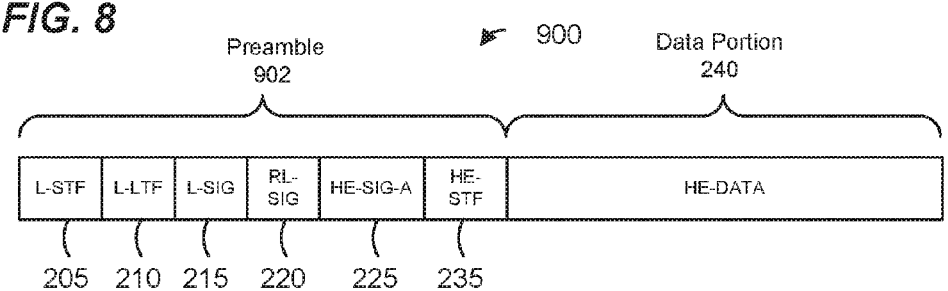
FIG. 8 is a diagram of yet another example PHY protocol data unit, according to an embodiment.

FIG. 8 is another example of PHY data unit 900 that a client station 25 is configured to transmit in response to a trigger frame 404. The PHY data unit 900 skips one or more HE-LTF fields, such as the HE-LTF fields 240.

FIGS. 5-8 are merely illustrative examples of PHY data units. In other embodiments, other suitable combinations of preamble fields are omitted.

In an embodiment, in at least a first mode of operation, a client station, such as the client station 25, is configured to transmit UL SU PHY data units (such as those described above) in response to a trigger frame. In at least a second mode of operation the client station is configured to self-initiate transmission of UL SU PHY data units. In some embodiments, a client station selects a mode of operation and indicates the selected mode in an UL control frame or management frame to an AP, such as the AP 14. In other embodiments, the AP 14 selects a mode of operation and indicates the selected mode in a DL control frame or management frame to a client station. In some embodiments, a client station is configured to operate according to both the first mode and the second mode.

Figure 9:
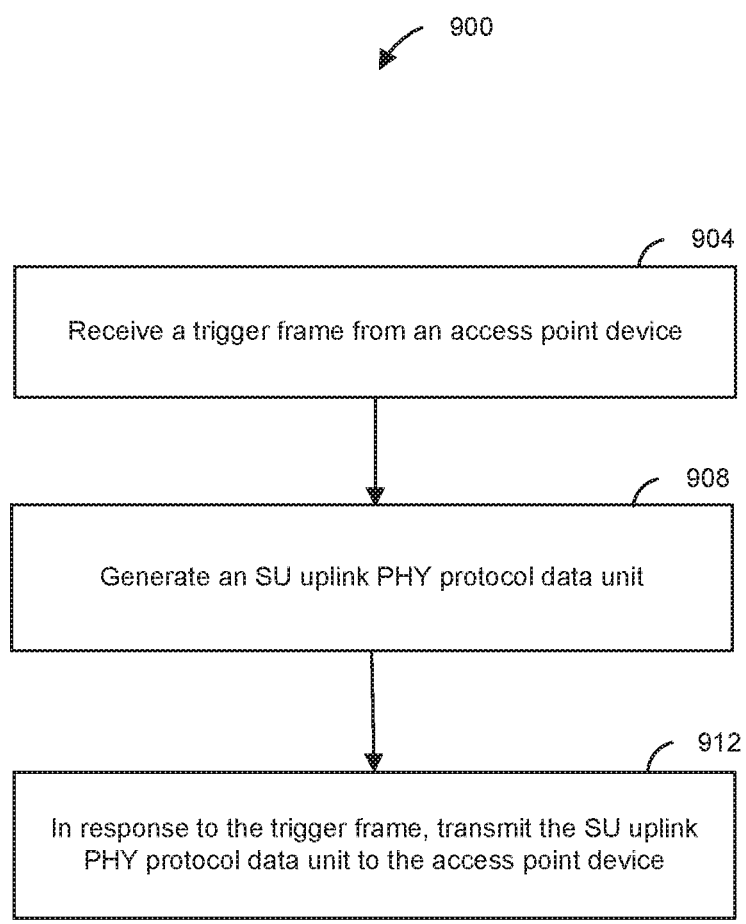
FIG. 9 is a flow diagram of an example method for communicating in a wireless communication network, according to an embodiment.

FIG. 9 is a flow diagram of an example method 900 for communicating in a wireless communication network, according to an embodiment. With reference to FIG. 1, the method 900 is implemented by the network interface device 27, in an embodiment. For example, in one such embodiment, the PHY processing unit 29 is configured to implement at least a portion of the method 900. According to another embodiment, the MAC processing unit 28 is configured to implement at least a portion of the method 900. In other embodiments, the method 900 is implemented by other suitable network interface devices.

At block 904, a trigger frame is received at a first communication device from a second communication device, the trigger frame included in a PHY protocol data unit. For example, in an embodiment, the client device 25-1 receives the trigger frame from the AP 14. In an embodiment, the PHY protocol data unit received at block 904 has a format such as described in connection with FIG. 3. In an embodiment, the PHY protocol data unit received at block 904 has a format such as described in connection with FIG. 4. In other embodiments, the PHY protocol data unit received at block 904 has another suitable format.

At block 908, an SU PHY protocol data unit is generated. In an embodiment, the SU PHY protocol data unit generated at block 908 is a SU uplink PHY protocol data unit. In an embodiment, the PHY protocol data unit generated at block 908 has a format such as described in connection with FIG. 3. In an embodiment, the PHY protocol data unit generated at block 908 has a format such as described in connection with FIG. 4. In various other embodiments, the PHY protocol data unit generated at block 908 has a format such as described in connection with any of FIGS. 5-8. In other embodiments, the PHY protocol data unit generated at block 908 has another suitable format.

In an embodiment, the PHY protocol data unit generated at block 908 includes a PHY protocol payload, and the PHY protocol payload includes data other than information that acknowledges a previous transmission from the second communication device. For example, in an embodiment, the PHY protocol payload includes user data other than an acknowledgement (ACK) frame or a block ACK (BA)

frame. In some embodiments, the PHY protocol payload does not include an ACK frame nor a BA frame.

At block 912, the SU PHY protocol data unit generated at block 908 is transmitted in response to the trigger frame received at block 904. In an embodiment, the SU PHY protocol data unit generated at block 908 is transmitted prior to the communication device (that is performing the method 900) transmitting any other PHY protocol data unit after receiving the trigger frame at block 904. In an embodiment, the SU PHY protocol data unit is transmitted a suitable time period (e.g., SIFS, etc.) after an end of the PHY protocol data unit received at block 904.

FIG. 10 is a flow diagram of another example method 1000 for communicating in a wireless communication network, according to an embodiment. With reference to FIG. 1, the method 1000 is implemented by the network interface device 16, in an embodiment. For example, in one such embodiment, the PHY processing unit 20 is configured to implement at least a portion of the method 1000. According to another embodiment, the MAC processing unit 18 is configured to implement at least a portion of the method 1000. In other embodiments, the method 1000 is implemented by other suitable network interface devices.

At block 1004, a trigger frame is generated by a first communication device. In an embodiment, trigger frame is configured to prompt a second communication device to transmit a PHY protocol data unit to the first communication device. In an embodiment, the first communication device is the AP 14 and the second communication device is the client device 25-1. In an embodiment, the trigger frame generated at block 1004 is included in a PHY protocol data unit, and the first communication device generates the PHY protocol data unit that includes the trigger frame. In an embodiment, the PHY protocol data unit generated at block 1004 has a format such as described in connection with FIG. 3. In an embodiment, the PHY protocol data unit generated at block 1004 has a format such as described in connection with FIG. 4. In other embodiments, the PHY protocol data unit generated at block 1004 has another suitable format.

At block 1008, the trigger frame generated at block 1004 is transmitted by the first communication device to the second communication device.

At block 1012, the first communication device receives a SU PHY protocol data unit from the second communication device in response to the trigger frame transmitted at block 1008. In an embodiment, the SU PHY protocol data unit received at block 1012 includes a PHY protocol payload that includes information other than information that acknowledges a previous transmission by the first communication device. In an embodiment, the SU PHY protocol data unit received at block 1012 is received at the first communication device prior to receiving any other PHY protocol data unit from the second communication device after transmitting the trigger frame.

In an embodiment, the PHY protocol data unit received at block 1012 has a format such as described in connection with FIG. 3. In an embodiment, the PHY protocol data unit received at block 1012 has a format such as described in connection with FIG. 4. In various embodiments, the PHY protocol data unit received at block 1012 has a format such as described in connection with any of FIGS. 5-8. In other embodiments, the PHY protocol data unit received at block 1012 has another suitable format.

In an embodiment, a method includes: receiving, at a first communication device from a second communication device, a trigger frame; generating, at the first communication device, a single-user (SU) physical layer (PHY) protocol data unit that includes a PHY protocol payload, wherein the PHY protocol payload include information other than information that acknowledges a previous transmission from the second communication device; and in response to the trigger frame, transmitting the SU PHY protocol data unit from the first communication device to the second communication device, wherein the first communication device transmits the SU PHY protocol data unit prior to the first communication device transmitting any other PHY protocol data unit after receiving the trigger frame.

In other embodiments, the method further includes one of, or any suitable combination of two or more of, the following features.

Generating the SU PHY protocol data unit comprises generating the SU PHY protocol data unit to omit one or more training fields from a preamble of the SU PHY protocol data unit, wherein a communication protocol requires that the first communication device include the one or more training fields in preambles of PHY protocol data units that are not transmitted in response to trigger frames from the second communication device.

Generating the SU PHY protocol data unit comprises generating the SU PHY protocol data unit to omit one or more signal fields from a preamble of the SU PHY protocol data unit, wherein a communication protocol requires that the first communication device include the one or more signal fields in preambles of PHY protocol data units that are not transmitted in response to trigger frames from the second communication device.

The trigger frame includes one or more indicators of PHY protocol parameters to be used for transmission of the SU PHY protocol data unit; and the method includes at least one of: i) generating the SU PHY protocol data unit according to the one or more indicators of PHY protocol parameters, and ii) transmitting the SU PHY data unit according to the one or more indicators of PHY protocol parameters.

The one or more indicators of PHY protocol parameters comprises one or more indicators of: a modulation and coding scheme (MCS) to be used for the SU PHY protocol data unit; duration information regarding the SU PHY protocol data unit; and a channel allocation associated with the SU PHY protocol data unit.

The method further includes: determining, at the first communication device, that the one or more one or more indicators of the PHY parameters are included in the trigger frame; and in response to determining, at the first communication device, that the one or more indicators of the PHY parameters are included in the trigger frame, generating a preamble of the SU PHY protocol data unit to omit one or more fields corresponding to the one or more indicators of PHY protocol parameters.

In another embodiment, an apparatus comprises a network interface device associated with a first communication device, the network interface device having i) a media access control layer (MAC) protocol processor implemented on one or more integrated circuits (ICs), and ii) a physical layer (PHY) protocol processor implemented on the one or more ICs. The one or more ICs are configured to: receive a trigger frame from a second communication device, generate a single-user (SU) physical layer (PHY) protocol data unit that includes a PHY protocol payload, wherein the PHY protocol payload include information other than information that acknowledges a previous transmission from the second communication device, and cause the first communication device to transmit, to the second communication device, the SU PHY protocol data unit in response to the trigger frame, such that the SU PHY protocol data unit is transmitted prior to the first communication device transmitting any other PHY protocol data unit after receiving the trigger frame.

In other embodiments, the apparatus further comprises one of, or any suitable combination of two or more of, the following features.

The one or more ICs are further configured to generate the SU PHY protocol data unit to omit one or more training fields from a preamble of the SU PHY protocol data unit, wherein a communication protocol requires that the first communication device include the one or more training fields in preambles of PHY protocol data units that are not transmitted in response to trigger frames from the second communication device.

The one or more ICs are further configured to generate the SU PHY protocol data unit to omit one or more signal fields from a preamble of the SU PHY protocol data unit, wherein a communication protocol requires that the first communication device include the one or more signal fields in preambles of PHY protocol data units that are not transmitted in response to trigger frames from the second communication device.

The trigger frame includes one or more indicators of PHY protocol parameters to be used for transmission of the SU PHY protocol data unit; and the one or more ICs are configured to, at least one of: i) generate the SU PHY protocol data unit according to the one or more indicators of PHY protocol parameters, and ii) cause the first communication device to transmit the SU PHY data unit according to the one or more indicators of PHY protocol parameters.

The one or more indicators of PHY protocol parameters comprises one or more indicators of: a modulation and coding scheme (MCS) to be used for the SU PHY protocol data unit; duration information regarding the SU PHY protocol data unit; and a channel allocation associated with the SU PHY protocol data unit.

The one or more ICs are further configured to: determine that the one or more indicators of the PHY parameters are included in the trigger frame; and in response to determining that the one or more indicators of the PHY parameters are included in the trigger frame, generate a preamble of the SU PHY protocol data unit to omit one or more fields corresponding to the one or more indicators of PHY protocol parameters.

The PHY protocol processor includes one or more transceivers.

The apparatus further comprises one or more antennas coupled to the one or more transceivers.

In yet another embodiment a method includes: generating, at a first communication device, a trigger frame configured to prompt a second communication device to transmit a single-user (SU) physical layer (PHY) protocol data unit to the first communication device; transmitting, from the first communication device to the second communication device, the trigger frame; and receiving, at the first communication device from the second communication device, the SU PHY protocol data unit having been transmitted by the second communication device in response to the trigger frame, wherein the SU PHY protocol data unit includes a PHY protocol payload that includes information other than information that acknowledges a previous transmission by the first communication device, and the SU PHY protocol data unit is received at the first communication device prior to receiving any other PHY protocol data unit from the second communication device after transmitting the trigger frame.

In other embodiments, the method further includes one of, or any suitable combination of two or more of, the following features.

The SU PHY protocol data unit includes a PHY protocol preamble; and the method further comprises skipping processing, at the first communication device, of one or more training fields in the preamble.

The SU PHY protocol data unit includes a PHY protocol preamble; and the method further comprises skipping processing, at the first communication device, of one or more signal fields in the preamble.

The trigger frame is configured to reserve a transmit opportunity period (TXOP) for transmission of the SU PHY protocol data unit by the second communication device.

The trigger frame is generated to include one or more indicators of PHY parameters to be used, by the second communication, for generation and/or transmission of the SU PHY protocol data unit.

In still another embodiment, an apparatus comprises a network interface device associated with a first communication device, the network interface device having i) a media access control layer (MAC) protocol processor implemented on one or more integrated circuits (ICs), and ii) a physical layer (PHY) protocol processor implemented on the one or more ICs. The one or more ICs are configured to: generate a trigger frame configured to prompt a second communication device to transmit a single-user (SU) physical layer (PHY) protocol data unit to the first communication device, cause the first communication device to transmit the trigger frame to the second communication device, and receive the SU PHY protocol data unit from the second communication device, wherein the second communication device transmitted the SU PHY protocol data unit in response to the trigger frame, the SU PHY protocol data unit includes a PHY protocol payload that includes information other than information that acknowledges a previous transmission by the first communication device, and the SU PHY protocol data unit is received at the first communication device prior to receiving any other PHY protocol data unit from the second communication device after transmitting the trigger frame.

In other embodiments, the apparatus further comprises one of, or any suitable combination of two or more of, the following features.

The SU PHY protocol data unit includes a PHY protocol preamble; and the one or more ICs are configured to skip processing of one or more training fields in the preamble.

The SU PHY protocol data unit includes a PHY protocol preamble; and the one or more ICs are configured to skip processing of one or more signal fields in the preamble.

The trigger frame is configured to reserve a transmit opportunity period (TXOP) for transmission of the SU PHY protocol data unit by the second communication device.

The one or more ICs are configured to generate the trigger frame to include one or more indicators of PHY parameters to be used, by the second communication, for generation and/or transmission of the SU PHY protocol data unit.

The PHY protocol processor includes one or more transceivers.

The apparatus further comprises one or more antennas coupled to the one or more transceivers.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc.

The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

What is claimed is:

1. A method, comprising:
   receiving, at a first communication device from a second communication device, a trigger frame;
   generating, at the first communication device, a single-user (SU) physical layer (PHY) protocol data unit that includes a PHY protocol payload, wherein the PHY protocol payload include information other than information that acknowledges a previous transmission from the second communication device; and
   in response to the trigger frame, transmitting the SU PHY protocol data unit from the first communication device to the second communication device, wherein the first communication device transmits the SU PHY protocol data unit prior to the first communication device transmitting any other PHY protocol data unit after receiving the trigger frame.

2. The method of claim 1, wherein generating the SU PHY protocol data unit comprises generating the SU PHY protocol data unit to omit one or more training fields from a preamble of the SU PHY protocol data unit, wherein a communication protocol requires that the first communication device include the one or more training fields in preambles of PHY protocol data units that are not transmitted in response to trigger frames from the second communication device.

3. The method of claim 1, wherein generating the SU PHY protocol data unit comprises generating the SU PHY protocol data unit to omit one or more signal fields from a preamble of the SU PHY protocol data unit, wherein a communication protocol requires that the first communication device include the one or more signal fields in preambles of PHY protocol data units that are not transmitted in response to trigger frames from the second communication device.

4. The method of claim 1, wherein:
   the trigger frame includes one or more indicators of PHY protocol parameters to be used for transmission of the SU PHY protocol data unit; and
   the method further includes at least one of:
   i) generating the SU PHY protocol data unit according to the one or more indicators of PHY protocol parameters, and
   ii) transmitting the SU PHY data unit according to the one or more indicators of PHY protocol parameters.

5. The method of claim 4, wherein the one or more indicators of PHY protocol parameters comprises one or more indicators of:
   a modulation and coding scheme (MCS) to be used for the SU PHY protocol data unit;
   duration information regarding the SU PHY protocol data unit; and
   a channel allocation associated with the SU PHY protocol data unit.

6. The method of claim 4, further comprising:
   determining, at the first communication device, that the one or more one or more indicators of the PHY parameters are included in the trigger frame; and
   in response to determining, at the first communication device, that the one or more indicators of the PHY parameters are included in the trigger frame, generating a preamble of the SU PHY protocol data unit to omit one or more fields corresponding to the one or more indicators of PHY protocol parameters.

7. An apparatus, comprising:
   a network interface device associated with a first communication device, the network interface device having i) a media access control layer (MAC) protocol processor implemented on one or more integrated circuits (ICs), and ii) a physical layer (PHY) protocol processor implemented on the one or more ICs;
   wherein the one or more ICs are configured to
   receive a trigger frame from a second communication device,
   generate a single-user (SU) physical layer (PHY) protocol data unit that includes a PHY protocol payload, wherein the PHY protocol payload include information other than information that acknowledges a previous transmission from the second communication device, and
   cause the first communication device to transmit, to the second communication device, the SU PHY protocol data unit in response to the trigger frame, such that the SU PHY protocol data unit is transmitted prior to the first communication device transmitting any other PHY protocol data unit after receiving the trigger frame.

8. The apparatus of claim 7, wherein the one or more ICs are further configured to generate the SU PHY protocol data unit to omit one or more training fields from a preamble of the SU PHY protocol data unit, wherein a communication protocol requires that the first communication device include the one or more training fields in preambles of PHY protocol data units that are not transmitted in response to trigger frames from the second communication device.

9. The apparatus of claim 7, wherein the one or more ICs are further configured to generate the SU PHY protocol data unit to omit one or more signal fields from a preamble of the SU PHY protocol data unit, wherein a communication protocol requires that the first communication device include the one or more signal fields in preambles of PHY protocol data units that are not transmitted in response to trigger frames from the second communication device.

10. The apparatus of claim 7, wherein:
    the trigger frame includes one or more indicators of PHY protocol parameters to be used for transmission of the SU PHY protocol data unit; and
    the one or more ICs are configured to, at least one of:
    i) generate the SU PHY protocol data unit according to the one or more indicators of PHY protocol parameters, and
    ii) cause the first communication device to transmit the SU PHY data unit according to the one or more indicators of PHY protocol parameters.

11. The apparatus of claim 10, wherein the one or more indicators of PHY protocol parameters comprises one or more indicators of:
    a modulation and coding scheme (MCS) to be used for the SU PHY protocol data unit;
    duration information regarding the SU PHY protocol data unit; and
    a channel allocation associated with the SU PHY protocol data unit.

12. The apparatus of claim 10, wherein the one or more ICs are further configured to:

determine that the one or more indicators of the PHY parameters are included in the trigger frame; and in response to determining that the one or more indicators of the PHY parameters are included in the trigger frame, generate a preamble of the SU PHY protocol data unit to omit one or more fields corresponding to the one or more indicators of PHY protocol parameters.

13. The apparatus of claim 7, wherein:
the PHY protocol processor includes one or more transceivers.

14. The apparatus of claim 13, further comprising:
one or more antennas coupled to the one or more transceivers.

15. A method, comprising:
generating, at a first communication device, a trigger frame configured to prompt a second communication device to transmit a single-user (SU) physical layer (PHY) protocol data unit to the first communication device;

transmitting, from the first communication device to the second communication device, the trigger frame; and receiving, at the first communication device from the second communication device, the SU PHY protocol data unit having been transmitted by the second communication device in response to the trigger frame, wherein
the SU PHY protocol data unit includes a PHY protocol payload that includes information other than information that acknowledges a previous transmission by the first communication device, and
the SU PHY protocol data unit is received at the first communication device prior to receiving any other PHY protocol data unit from the second communication device after transmitting the trigger frame.

16. The method of claim 15, wherein:
the SU PHY protocol data unit includes a PHY protocol preamble; and
the method further comprises skipping processing, at the first communication device, of one or more training fields in the preamble.

17. The method of claim 15, wherein:
the SU PHY protocol data unit includes a PHY protocol preamble; and
the method further comprises skipping processing, at the first communication device, of one or more signal fields in the preamble.

18. The method of claim 15, wherein the trigger frame is configured to reserve a transmit opportunity period (TXOP) for transmission of the SU PHY protocol data unit by the second communication device.

19. The method of claim 15, wherein the trigger frame is generated to include one or more indicators of PHY parameters to be used, by the second communication, for generation and/or transmission of the SU PHY protocol data unit.

20. An apparatus, comprising:
a network interface device associated with a first communication device, the network interface device having i) a media access control layer (MAC) protocol processor implemented on one or more integrated circuits (ICs), and ii) a physical layer (PHY) protocol processor implemented on the one or more ICs;

wherein the one or more ICs are configured to
generate a trigger frame configured to prompt a second communication device to transmit a single-user (SU) physical layer (PHY) protocol data unit to the first communication device,
cause the first communication device to transmit the trigger frame to the second communication device, and
receive the SU PHY protocol data unit from the second communication device, wherein
the second communication device transmitted the SU PHY protocol data unit in response to the trigger frame,
the SU PHY protocol data unit includes a PHY protocol payload that includes information other than information that acknowledges a previous transmission by the first communication device, and
the SU PHY protocol data unit is received at the first communication device prior to receiving any other PHY protocol data unit from the second communication device after transmitting the trigger frame.

21. The apparatus of claim 20, wherein:
the SU PHY protocol data unit includes a PHY protocol preamble; and
the one or more ICs are configured to skip processing of one or more training fields in the preamble.

22. The apparatus of claim 20, wherein:
the SU PHY protocol data unit includes a PHY protocol preamble; and
the one or more ICs are configured to skip processing of one or more signal fields in the preamble.

23. The apparatus of claim 20, wherein the trigger frame is configured to reserve a transmit opportunity period (TXOP) for transmission of the SU PHY protocol data unit by the second communication device.

24. The apparatus of claim 20, wherein the one or more ICs are configured to generate the trigger frame to include one or more indicators of PHY parameters to be used, by the second communication, for generation and/or transmission of the SU PHY protocol data unit.

25. The apparatus of claim 20, wherein:
the PHY protocol processor includes one or more transceivers.

26. The apparatus of claim 25, further comprising:
one or more antennas coupled to the one or more transceivers.

* * * * *